3,441,225
MIXER ASSEMBLY FOR WIDE-PATH SPREADER
OF GRANULAR MATERIALS
Howard E. Cotter and Jay E. Barth, both of R.R. 1,
Flanagan, Ill. 61740
Filed Oct. 4, 1967, Ser. No. 672,876
Int. Cl. A01c 17/00; G01f 11/24
U.S. Cl. 239—683                 4 Claims

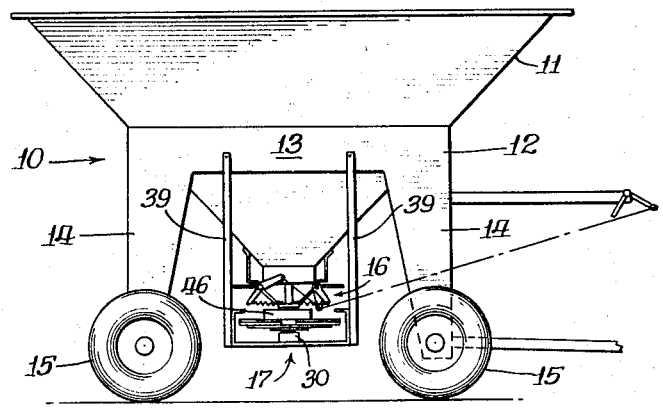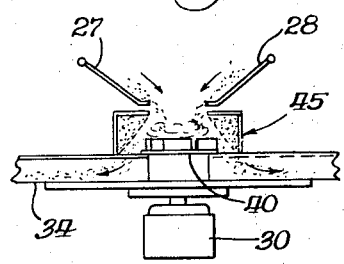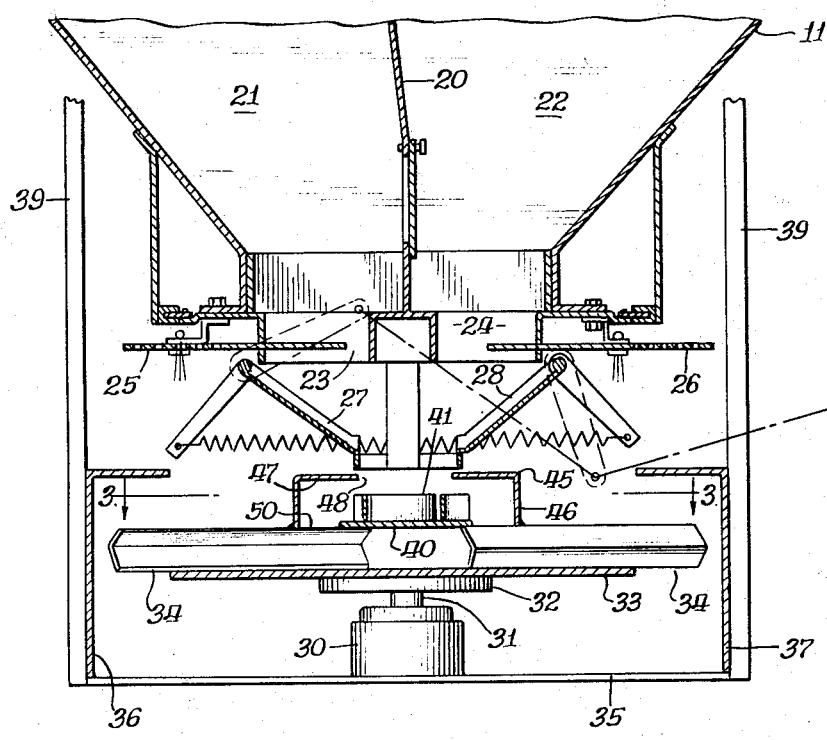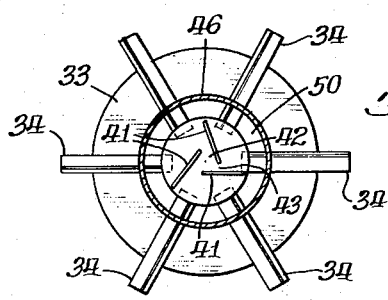

ABSTRACT OF THE DISCLOSURE

A mixing chamber is located beneath the separate discharge throats of a compartmentalized hopper in a wide-path spreader for granular material. The chamber is mounted on a rotating fan beneath the hopper which forces the material laterally in spreading it; and it includes a horizontal base plate, a cylindrical side wall around the base plate and spaced therefrom to provide an annular aperture above the fan, a cover plate integral with the top of the wall and defining a central aperture for receiving the material from the discharge throats, and a plurality of mixing blades mounted on the base plate within the chamber. The mixing blades lie in vertical planes about a central zone for receiving the falling granular material, and adjacent blades define side openings through which the material is scattered against the housing of the chamber in a cone-shaped mixing pattern before it is guided through the annular aperture onto the rotating fan for spreading.

RELATED APPLICATIONS

The present invention is an improved mixer assembly for the apparatus disclosed in the copending application of Cotter et al. for Center-Feed Spreader, Ser. No. 630,-720, filed Apr. 13, 1967. While the present assembly is particularly suited for use with the center-feed spreader described therein, the invention claimed herein is not limited to use with any specific type of spreader other than one designed to spread granular material, such as fertilizer or grain.

Background

The present invention relates to a power-assisted, wide-path spreader of the kind intended to be drawn by a tractor and to carry large amounts of granular material; more particularly the present invention relates to a mixing assembly receiving the material from one or more compartments within the spreader and for thoroughly mixing the materials and depositing them in a uniform distribution pattern on a rotating fan which forces the material laterally of the spreader. In this type of spreader, which is designed to uniformly spread the material on both sides as it is pulled behind a tractor, it is obviously desirable to spread equal amounts of material on each side. Further, for the case in which two separate materials are being blended and spread, it is desirable that proper proportions of each material be thoroughly mixed before spreading to achieve a uniform distribution.

Since it has been found as described in the above-identified patent application, that a rotating fan and baffle assembly located beneath a funnel-shaped hopper may advantageously be employed to spread material over a forty-foot wide path, it is necessary to distribute the mixed material evenly about the rotating fan. In this application, the rotating fan forces the material radially, and the transverse baffles channel it laterally of the spreader.

Previous methods of distributing the granular material that is to be spread on the rotating fan have not proved effective for all the various combinations in which such spreaders may typically be used. For instance, if only the material from one compartment is being spread while the other compartment is either empty or closed, there would be an uneven distribution of the material in that more material would be forced to one side of the spreader than the other. This is principally due to the fact that each material is initially deposited to one side or the other of the rotating fan. Hence, the transverse baffle structure associated with the fan would channel most of the material to one side; the first open side to which the fan rotated the deposited material would therefore receive more material than would the other.

Further, when it was desired to use two separate materials and mix them as they are being spread, this effect resulted in one side's receiving more of one material while the other side received more of the second material.

Summary

The present invention provides a mixing chamber mounted on the rotating fan used for spreading, and the chamber includes a housing defining a central aperture for receiving the granular material whether one or two discharge throats are being used. The mixing chamber rotates with the fan, and mixer blades are mounted on a base plate within the chamber for scattering the material within the chamber in a cone-shaped mixing pattern. At the bottom of the mixing chamber, there is defined an annular opening which is symmetrical with respect to the center of the rotating fan and through which flows the material in an evenly distributed pattern onto the rotating fan.

In the case in which only one compartment is being used, the mixing chamber greatly enhances the distribution of the grain on the rotating fan; and in the case in which separate materials are both being spread, the mixing chamber provides in addition, a very throuogh mixing of both components before the mixture is distributed on the fan.

Thus, not only are equal proportions of the same material evenly spread to either side of the spreader, but in addition, the separate components are thoroughly mixed before they are spread.

Other features and advantages of the instant invention will be obvious to persons skilled in the art in the following detailed description of a preferred embodiment accompanied by the attached drawing in which identical reference numerals will refer to like elements in the various views.

The drawing

FIG. 1 is a side elevation of a wide-path spreader incorporating the inventive mixer assembly;

FIG. 2 is a side section view illustrating the inventive mixer assembly with the associated discharge throats of the hopper;

FIG. 3 is a plan view of the mixing assembly taken through the sight line 3—3 of FIG. 2; and FIG. 4 is a schematic illustration of the mixing pattern of grain in the mixer assembly.

Detailed description

In FIG. 1 the spreader is generally designated by reference numeral 10. It is seen to comprise a funnel-shaped hopper 11 mounted on a frame or carriage 12.

The carriage 12 includes an upper peripheral supporting frame 13 receiving the hopper 11. Four leg members, each identified by reference numeral 14 depend from the corners of the frame 13. The entire spreader is mounted on wheels 15.

Mounted at the lower mouth of the hopper 11 is a metering unit generally designated 16. A fan and baffle assembly, generally designated 17, is supported by the peripheral frame 13 and adapted to receive granular material passing through the metering unit 16. The fan and baffle assembly 17 is designed to spread the material laterally beneath the spreader.

Additional details of the overall spreader can be obtained from the above-identified copending application of the same inventors; but certain of the details concerning the discharge throats and the metering unit are repeated in FIG. 2 for the purpose of providing a setting for the instant invention.

Referring then to FIG. 2, although the preferred embodiment of the spreader is convertible between a conventional grain wagon and a spreader, it has been shown as being set up as a spreader. The hopper 11 is divided by means of a center divider 20 into a first compartment 21 and a second compartment 22. A first discharge throat 23 communicates with the compartment 21; and a second discharge throat 24 communicates with the compartment 22.

Slide valves 25 and 26 are fitted in apertures respectively in the walls of discharge throats 23 and 24 for independently adjusting the flow rate from each of the compartments 21 and 22. In addition to the adjustable slide valves, the metering unit 16 also includes a first trap door 27 movable between a closed position in which it completely shuts the discharge throat 23 and an open position (which is shown in FIG. 2) for funneling material received through the discharge throat 23 toward the center of the spreader. A similar trap door 28 is associated with the discharge throat 24 for performing the similar function of funneling material received from the hopper compartment 22 toward the center of the unit.

The fan and baffle assembly comprises a conventional hydraulic motor 30 having a shaft 31 coupled to a disc 32. A horizontal mounting plate 33 is mounted to the disc 32; and a series of fan blades 34 are mounted in radial disposition about the mounting plate 33 (see FIG. 3). The hydraulic motor 30 is mounted on a separate mounting plate 35 which itself is mounted between two transverse baffle plates 36 and 37. Each of the baffle plates 36 and 37 has an inverted L-shape; and they are disposed such that the foot portion of the L extends horizontally above the rotating fan blades 34.

The fan and baffle assembly is an integral unit, as described in the above-identified application, and it is mounted to the frame 13 of the carriage 12 by means of four support bars 39 which are removably secured to the frame 13.

Mixer assembly

The mixer assembly receives granular material from the discharge throats, mixes it thoroughly, and distributes it in an even pattern onto the rotating fan. The mixer assembly includes a central mounting plate 40 which is mounted concentric with the plate 33 to the top of the radial fan blades 34. Mixer blades 41 are vertically mounted on the center plate 40, and as can be seen from the plan view in FIG. 3, the mixer blades 40 define a central area 42. Adjacent mixer blades define lateral apertures as 43 through which material received in the central area 42 may be centrifuged after mixing.

A housing 45 including a cylindrical side wall 46 and integral cover plate 47 defining a central aperture 48 is welded at its base to the top of the radial fan blades 34. The base of the cylindrical side wall 46 is spaced from the center plate 40 to define an annular aperture 50 through which the mixed material is forced as it is distributed on the rotating fan. The central aperture 48 receives material as it falls from the trap doors 27 and 28 into the mixing chamber.

Operation

In operation, the mixer assembly rotates with the fan 34, and the mixing pattern is schematically illustrated in FIG. 4 wherein the grain is seen to be channeled by the open trap doors 27 and 28 into the central aperture 48 of the housing 45. The rotating mixer blades 41 thoroughly mix the grain, and the whirling grain in the mixer assembly defines a cone-shaped mixing pattern within the mixing chamber 45 before it is forced through the circular aperture 50 onto the rotating fan.

This cone-shaped mixing pattern is considered an important feature of the invention since it allows the thorough mixing of two separate grains while forming the mixture into the generally annular pattern required for an even distribution onto the rotating fan. At the same time, in the situation in which only one discharge throat is open, it forces an even distribution of the grain within the mixing chamber while still forming iitnto the required annular shape. It will be appreciated that the center plate 40 and the cylindrical side wall 46 of the mixing chamber cooperate to provide a guide means for transmitting the grain through the annular aperture 50 onto the rotating fan.

Hence, the inventive mixer assembly described above has allowed the wide-path spreader to be useful either as a spreader of a single material (that is using only a single hopper compartment), or as a mixer and spreader in which case it allows both compartments to be used and thoroughly mixes two separate materials before feeding them to the rotating spreading fan blades.

Having thus described in detail a preferred embodiment of our invention, it will be obvious to persons skilled in the art that certain structural details may be modified or equivalent structure substituted for that which has been shown without departing from the principle of our invention; it is therefore intended that all such substitutions and modifications be covered as they are embraced within the spirit and the scope of the appended claims.

We claim:

1. In a spreader for granular material including compartment means for storing and transporting said material, discharge throat means communicating with said compartment means for metering said material being spread, and rotatable fan means beneath said discharge throat receiving said material being metered for forcing said material laterally thereof in spreading the same, the improvement comprising: a mixing chamber mounted on said fan means adapted for rotation therewith and defining an upper aperture for receiving material from said discharge throat, a lower aperture above said fan, and further defining guide means for directing material exiting from said chamber through said lower aperture onto said fan; and mixer blade means in said chamber for scattering said material within said chamber before said material exits through said lower aperture onto said fan, whereby said material is uniformly mixed and distributed on said fan.

2. The structure of claim 1 wherein said mixing chamber comprises a plate mounted on said rotatable fan and a cylindrical housing above said plate and spaced from said plate to provide an annular opening for distributing material from said chamber onto said fan, said housing further defining an aperture beneath said discharge throat for receiving said material.

3. The structure of claim 2 wherein said mixer blades comprise a plurality of elongated blades mounted in a vertical disposition on said plate beneath said chamber aperture, adjacent blades defining a side opening through which material received through said top aperture is scattered by said mixer blades against said cylindrical chamber wall and guided through said annular opening onto said rotating fan.

4. The structure of claim 3 characterized by the fact that said grain scattered in said mixing chamber defines a cone-shaped mixing pattern therein.

References Cited

UNITED STATES PATENTS

| | | | |
|---|---|---|---|
| 3,038,643 | 6/1962 | Van der Lely et al. | 239—683 |
| 3,133,737 | 5/1964 | Kaller | 239—683 |

ROBERT B. REEVES, *Primary Examiner.*

H. S. LANE, *Assistant Examiner.*

U.S. Cl. X.R.

222—178, 239; 239—687